March 27, 1945.　　　　H. NEWSAM　　　　2,372,511
POWER SYSTEM INCLUDING A ROTARY TRANSFORMER
Filed June 17, 1943

Inventor:
Harold Newsam,
by Harry E. Dunham
His Attorney.

Patented Mar. 27, 1945

2,372,511

UNITED STATES PATENT OFFICE 2,372,511

POWER SYSTEM INCLUDING A ROTARY TRANSFORMER

Harold Newsam, Sheffield, England, assignor to Metropolitan-Vickers Electrical Company Limited, London W. C. 2, England, a company of Great Britain Application June 17, 1943, Serial No. 491,133

11 Claims. (Cl. 172—239)

My invention relates to power systems including direct current rotary transformers of the armature reaction excitation type and more particularly to power systems for driving vehicles wherein the driving motors are connected between the primary and secondary brushes of the rotary transformers.

Various systems have been devised for producing smooth acceleration of direct current motors adapted to be connected substantially directly across the source of electrical power supply through a device or devices which inherently regulate the electrical potential and current of the motors during acceleration and normal running and which also utilize the motors to provide a retarding or braking force when desired. It has been found that these characteristics can readily be obtained in a power system using a rotary transformer of the armature reaction excitation type connected to the source of power with a proper arrangement for connecting each of the driving motors across a brush of the transformer primary brushes and a brush of the transformer secondary brushes. This general type of system has been described in detail in United States Patents 1,969,699, J. M. Pestarini, and 2,282,874, H. G. Moore and F. Felix, wherein a rotary transformer is used to supply the power to driving motors connected as described above. Such a system provides two load loop or branch circuits through the armature of the rotary transformer with an external load in each branch and has been termed an "8-connection."

An object of my invention is to provide smooth accelerating and braking torques by the driving motors in a power system of the above type.

Another object of my invention is to provide an electrical power system having an arrangement for utilizing the driving motors to provide a retarding or braking force to a driven vehicle and to assure the absorption of the power generated during these periods.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
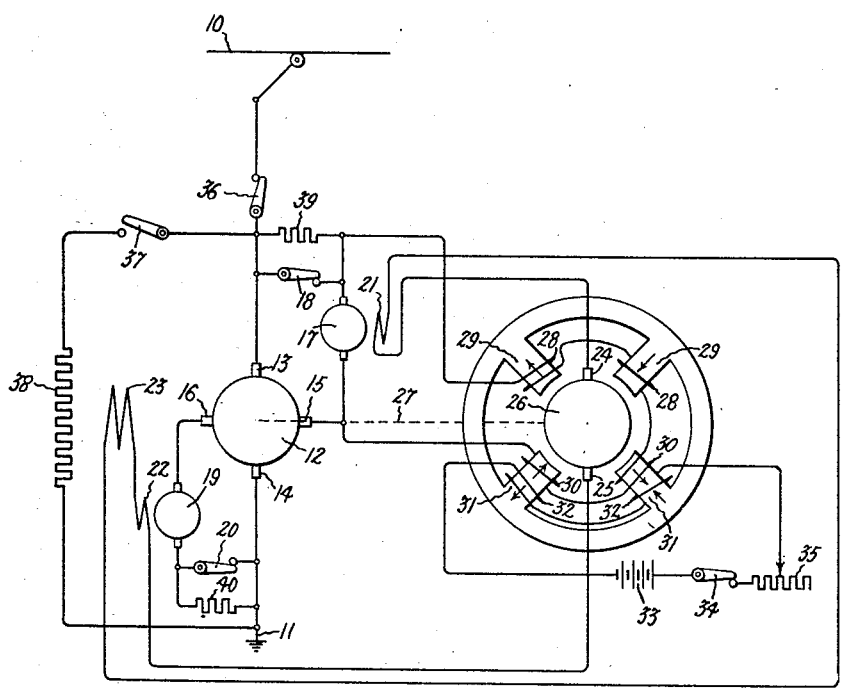
Figure 2:
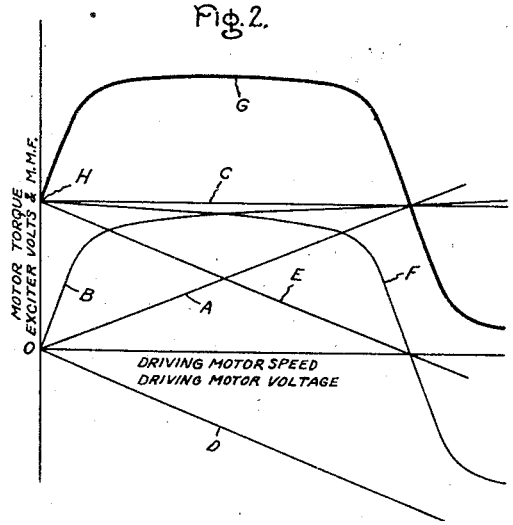

In the drawing, Fig. 1 illustrates an electrical power system wherein an armature reaction excited rotary transformer is adapted to supply power from a source of electrical power supply to driving motors connected to the transformer in "figure 8" connection and includes starting and braking resistances with an arrangement for connecting these to provide the desired braking to the system; and Fig. 2 shows characteristic curves of the exciter in the system and resultant operating characteristics of the system.

Referring to the drawing, I have shown an electrical power system particularly adapted for use in driving traction vehicles. Electrical power is adapted to be supplied to the vehicle from a third rail or trolley 10 with one side grounded at 11. An armature reaction excited dynamo-electrical machine, such as a rotary transformer, having an armature 12 with a winding connected to a commutator is provided with primary brushes 13 and 14 adapted to be connected to the source of electrical power supply and secondary brushes 15 and 16 electrically displaced about the commutator from the primary brushes 13 and 14. An electrical load comprising a plurality of motors is connected in figure 8 connection to the transformer brushes. This load includes a driving motor 17 adapted to be connected to the secondary brush 15 and to the primary brush 13 through a switch 18, and another driving motor 19 is adapted to be connected between the secondary brush 16 and the primary brush 14 through a switch 20. This forms two load loops or branches including a driving motor connected in each of the load loops between a primary brush and a secondary brush of the transformer primary and secondary brush sets.

In traction equipment, it is desirable that the vehicle should be accelerated and decelerated smoothly. In order to obtain this result with a power system such as that shown in the drawing, it is desirable that the torques of the driving motors 17 and 19 should increase with an increase in speed when the motors operate at a relatively low speed up to a desired speed of operation, that the motors should operate with a substantially constant torque over a given range of speed, and that beyond a given speed, the torque of the motors should decrease in order to prevent the operation of the vehicle above a desired safe operating speed. Likewise, it is desirable that when the motors are used for regenerative or dynamic braking, the resisting or braking torque of the motors should increase from the maximum operating speed of the vehicle as the speed of the vehicles and motors decreases to a certain value, then should exert a substantially constant resisting torque over a range of speed to a relatively low speed, after which the resisting torque of the motors should decrease to a predetermined value at standstill. In order to obtain this characteristic, the motors 17 and 19 are provided with field exciting windings 21 and 22, respectively, which are connected in series with each other and with a rotary transformer field exciting winding 23. These field exciting windings are connected across the brushes 24 and 25 of the armature 26 of an exciter adapted to be driven through a suitable coupling or shaft 27 by the armature 12 of the rotary transformer. By controlling the excitation of the exciter, the voltage across the exciter brushes 24 and 25 can be made to vary inherently so as to provide the motors and the rotary transformer with an excitation which will result in the above-described motor and braking characteristics. The exciter is provided with field exciting windings 28 on the pole pieces 29, and these field exciting windings and pole pieces are arranged to provide a component of excitation to the armature 26 which provides a substantially complete magnetic circuit. Field exciting windings 30 are arranged on pole pieces 31 and are connected in series with the field exciting windings 28 across the terminals of one of the driving motors 17 in one of the load branches. Main field exciting windings 32 also are arranged on the pole pieces 31 to provide components of excitation thereto in opposition to and greater than the components of excitation provided by the field exciting windings 30. The excitation provided by the field exciting windings 30 and 32 also forms a substantially complete magnetic circuit with the pole pieces 31, and this circuit is substantially independent of the magnetic circuit formed by the field exciting windings 28 and the pole pieces 29. The field exciting windings 32 are adapted to be energized by any suitable source of constant voltage direct current source of electrical power supply, such as a battery 33, and these windings are connected to the battery through a switch 34 and a variable control resistor 35 which is arranged to control the substantially constant component of excitation provided by the field exciting windings 32. With this type power system, the voltage across a driving motor 17 is equal to the voltage between the primary brush 13 and the secondary brush 15 across which the motor is connected, and this voltage may vary in accordance with the variation in the potential between the secondary brush 15 and the primary brush 14. This operation of a figure 8 connection is fully described in the above-mentioned patents which also describe the operation of the field exciting winding 23 as a "variator" field exciting winding for controlling the characteristics of the rotary transformer.

In this system of connections, the volts across the driving motor increase with an increase in speed and, therefore, the energizations of the field exciting windings 28 increase with an increase in the voltage and speed of the driving motor 17, as indicated by the curve A in Fig. 2. The magnetomotive force produced by the field exciting windings 28 produces flux in the magnetic circuit including the pole pieces 29 which varies with the driving motor speed, as indicated by the curve B. This represents the magnetization curve of this magnetic circuit responsive to the magnetomotive force A. The field exciting windings 32 are energized at a constant value and provide a magnetomotive force in the magnetic circuit including the field poles 31, as indicated by the curve C, and the field exciting windings 30 are energized by the same energizing current which flows through the field exciting windings 28, but since the field exciting windings 32, the magnetomotive force produced by the energization thereof is opposed to the magnetomotive force produced by the field exciting windings 32 and, therefore, may be represented by the curve D. The net or resultant magnetomotive force in the magnetic circuit excited by the field exciting windings 30 and 32 is represented by the curve E. The excitation or flux produced in the magnetic circuit including the pole pieces 31 is responsive to the magnetomotive force E and is represented by the curve F. The armature 26 of the exciter may be provided with a conventional direct current type wave winding and the voltage induced in this winding by the two independent magnetic circuits is the resultant or algebraic summation of the curves B and F, and is represented by the curve G. Thus, the voltage across the exciter brushes 24 and 25 is made to vary rapidly in accordance with variations in speed at low motor speeds, remains substantially constant over a given range of speeds, and then vary rapidly inversely with further changes in speed above a predetermined value. When the motors 17 and 19 are providing a driving tractive effort to the vehicle, the energization of their field exciting windings 22 and the energization of the transformer field exciting winding 23 responds to the speed of the motor 17 in accordance with the exciter voltage characteristic G, and insures that the speed of the driving motors will increase rapidly and smoothly at low motor speeds, remain substantially constant for the larger part of the operating speed of the motor, and then decrease smoothly and rapidly above a predetermined maximum speed, thus assuring that the system will not operate at a destructively high speed.

This system may be used for regenerative braking under normal operating conditions, or dynamic braking may be used if contact with the third rail or trolley 10 is lost or if the voltage of the third rail or trolley becomes the same as ground voltage, that is, if the source of supply becomes short circuited. When regenerative braking is used, the two switches 18 and 20 are kept closed, as shown in Fig. 1, and a main line switch 36 also is kept closed. Under these conditions, the motors will tend to generate a back electromotive force higher than the voltage impressed thereacross by the rotary transformer, and this voltage will follow the excitation of the motors as provided by the field exciting windings 21 and 22 such that the voltage of the motors will vary with the speed thereof substantially in accordance with curve G of Fig. 2. Since the voltage is being impressed across the source of electrical power supply, the current delivered by the motors will follow substantially the same characteristic as the voltage thereof, and the resisting or braking torque delivered by these motors will also be substantially the same as that represented by the curve G in Fig. 2. This will provide a very satisfactory braking torque for regenerative braking, and substantially the same result can be obtained if the voltage of the source of supply is removed as explained above by opening the main line switch 36 and closing the switch 37 in circuit with a main load absorbing or braking resistor 38 connected in series with the switch 37 across the primary brushes 13 and 14 of the rotary transformer. This will provide a reasonably good motor braking torque for normal dynamic braking conditions and may also be represented by the curve G. Under certain conditions, it becomes desirable that the vehicle should be stopped very rapidly, and for such an emergency it is desirable that the braking torques of the motors be maintained as high as possible for as long a period as possible until the vehicle is brought to a stop. For emergency braking, the switches 18 and 20 are opened and thereby insert emergency braking resistors 39 and 40 in series with the motor armatures 17 and 19 will provide a maximum brak in the drawing, the excitation provided by the field exciting windings 21 and 22 to the motor armatures 17 and 19 will provide a maximum braking torque over the major portion of the operating speed of the motors, and while this braking torque will fall off when the motor speed approaches zero, the motors will still have a substantial braking torque at substantially standstill, as indicated by the value H in Fig. 2. Thus, my improved system provides for smooth and efficient motor operation, both when the motors are operating for driving purposes and when the motors are operating to produce a braking or retarding torque. Under braking conditions, this system provides for the smooth and efficient operation of the motors for normal regenerative braking, for normal dynamic braking when the voltage of the source of supply is lost, and for emergency braking conditions, and insures a maximum smooth braking torque for all three types of braking conditions.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electrical system including a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling the secondary brush current of said rotary transformer, a field exciting winding for each of said motors, an exciter, means for energizing said rotary transformer field exciting winding and said motor field exciting windings by said exciter, means including field exciting windings for said exciter responsive to the voltage across a motor in one branch of said 8-connection and responsive to a controllable substantially constant source of energization for providing a torque to said motors at low speeds rapidly variable therewith with a substantially constant torque in a given speed range and a torque rapidly inversely variable with motor speed above a given speed, all of said torque values being controllable.

2. An electrical system including a rotary transformer of the armature reaction excited type having a primary brush set and a secondary brush set, a pair of driving motors, means for connecting one of said motors in each branch circuit in figure 8 connection to said rotary transformer primary and secondary brushes, a field exciting winding for controlling the current of said rotary transformer, a field exciting winding for each of said motors, an exciter, means for connecting said rotary transformer field exciting winding and said motor field exciting windings in series circuit to said exciter, a field exciting winding for said exciter arranged to provide a component of excitation to said exciter dependent on the voltage across a motor in one branch of said 8-connection, a second field exciting winding for said exciter connected in series with said first-mentioned exciter field exciting winding and arranged to provide a component of excitation to said exciter to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, and means for energizing said exciter third field exciting winding independently of the voltage of said motors and said rotary transformer.

3. An electrical system including a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling the current of said rotary transformer, a field exciting winding for each of said motors, an exciter, means for connecting said rotary transformer field exciting winding and said motor field exciting windings in series circuit to said exciter, a field exciting winding for said exciter arranged to provide a component of excitation to said exciter dependent on the voltage across a motor in one branch of said 8-connection, a second field exciting winding for said exciter arranged to provide a component of excitation to said exciter dependent on the voltage across said motor in said branch of said 8-connection to a magnetic field circuit substantially independent of said exciter first-mentioned field exciting winding, a third field exciting winding for said exciter arranged to provide a component of excitation to said exciter substantially in opposition to said exciter second field exciting winding, and means for energizing said exciter third field exciting winding independently of the voltage of said motors and said rotary transformer.

4. In combination with a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling the secondary brush current of said rotary transformer, a field exciting winding for each of said motors, an exciter, means for energizing said rotary transformer field exciting winding and said motor field exciting windings by said exciter, a field exciting winding for said exciter arranged to provide a component of excitation to said exciter dependent on the voltage across a motor in one branch of said 8-connection, a second field exciting winding for said exciter arranged to provide a component of excitation to said exciter dependent on the voltage across said motor in said branch of said 8-connection to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, and means for energizing said exciter third field exciting winding independently of the voltage of said motors and said rotary transformer.

5. A power system including a source of electrical power supply, a rotary transformer of the armature reaction excited type having a primary brush set and a secondary brush set, means for connecting said primary brush set to said source of electrical power supply, a plurality of driving motors, means for connecting said motors in two branch circuits in figure 8 connection to said rotary transformer primary and secondary brushes, a field exciting winding for controlling said rotary transformer, a field exciting winding for each of said motors, an exciter, means for energizing said rotary transformer field exciting winding and said motor field exciting windings by said exciter, a field exciting winding for said exciter arranged to provide a component of excitation to said exciter dependent on the voltage across a motor in one branch of said 8-connection, a second field exciting winding for said exciter arranged to provide a component of excitation to said exciter dependent on the voltage across said motor in said branch of said 8-connection to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, and means for energizing said exciter third field exciting winding independently of the voltage of said motors and said rotary transformer.

6. In combination with a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling said rotary transformer, a field exciting winding for each of said motors, an exciter, means for connecting said rotary transformer field exciting winding and said motor field exciting windings in series circuit to said exciter, a field exciting winding for said exciter arranged to provide a component of excitation to said exciter dependent on the voltage across a motor in one branch of said 8-connection, a second field exciting winding for said exciter connected in series with said exciter first-mentioned field exciting winding and arranged to provide a component of excitation to said exciter to a magnetic field circuit substantially independent of said exciter first-mentioned field exciting winding excitation, a third field exciting winding for said exciter arranged to provide a component of excitation to said exciter substantially in opposition to and greater than said exciter second field exciting winding excitation, means for energizing said exciter third field exciting winding independently of the voltage of said motors and said rotary transformer, emergency braking resistances, and means for connecting one of said emergency braking resistances in series circuit in each motor branch of said 8-connection.

7. In combination with a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling said rotary transformer, a field exciting winding for each of said motors, an exciter, means for energizing said rotary transformer field exciting winding and said motor field exciting windings by said exciter, a field exciting winding for said exciter arranged to provide a component of excitation to said exciter dependent on the voltage across a motor in one branch of said 8-connection, a second field exciting winding for said exciter arranged to provide a component of excitation to said exciter dependent on the voltage across said motor in said branch of said 8-connection to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, means for energizing said exciter third field exciting winding independently of the voltage of said motors and said rotary transformer, emergency braking resistances, and means for connecting one of said emergency braking resistances in series circuit in each motor branch of said 8-connection.

8. In combination with a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling said rotary transformer, a field exciting winding for each of said motors, an exciter, means for energizing said rotary transformer field exciting winding and said motor field exciting windings by said exciter, a field exciting winding for said exciter arranged to provide a component of excitation to said exciter dependent on the voltage across a motor in one branch of said 8-connection, a second field exciting winding for said exciter connected in series with said exciter first-mentioned field exciting winding and arranged to provide a component of excitation to said exciter to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, means for energizing said exciter third field exciting winding independently of the voltage of said motors and said rotary transformer, a main load absorbing braking resistance, and means for connecting said main load resistance across said primary brushes to establish dynamic braking operation.

9. In combination with a rotary transformer of the armature reaction excited type having a primary brush set and a secondary brush set, a plurality of driving motors, means for connecting said motors in two branch circuits in figure 8 connection to said rotary transformer primary and secondary brushes, a field exciting winding for controlling said rotary transformer, a field exciting winding for each of said motors, an exciter, means for energizing said rotary transformer field exciting winding and said motor field exciting windings by said exciter, a field exciting winding for said exciter arranged to provide a component of excitation to said exciter dependent on the voltage across a motor in one branch of said 8 connection, a second field exciting winding for said exciter arranged to provide a component of excitation to said exciter dependent on the voltage across said motor in said branch of said 8 connection to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, means for energizing said exciter third field exciting winding independently of the voltage of said motors and said rotary transformer, a main load absorbing braking resistance, means for connecting said main load resistance across said primary brushes to establish dynamic braking operation, emergency braking resistances, and means for connecting one of said emergency braking resistances in series circuit in each motor branch of said 8 connection.

10. A power system including a source of electrical power supply, a rotary transformer of the armature reaction excited type having a primary brush set and a secondary brush set, means for connecting said primary brush set to said source of electrical power supply, a plurality of driving motors, means for connecting said motors in two branch circuits in figure 8 connection to said rotary transformer primary and secondary brushes, a field exciting winding for controlling said rotary transformer, a field exciting winding for each of said motors, an exciter, means for energizing said rotary transformer field exciting winding and said motor field exciting windings by said exciter, a field exciting winding for said exciter arranged to provide a component of excitation to said exciter dependent on the voltage across a motor in one branch of said 8-connection, a second field exciting winding for said exciter arranged to provide a component of excitation to said exciter dependent on the voltage across said motor in said branch of said 8-connection to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, means for energizing said exciter third field exciting winding independently of the voltage of said motors and said rotary transformer, a main load absorbing braking resistance, means for connecting said main load resistance across said primary brushes to establish dynamic braking operation, emergency braking resistances, and means for connecting one of said emergency braking resistances in series circuit in each motor branch of said 8-connection.

11. A power system including a source of electrical power supply, an armature reaction excited rotary transformer having a commutator with a pair of primary brushes and a pair of secondary brushes electrically displaced from said primary brushes, means for connecting said primary brushes across said source of electrical power supply, a pair of driving motors, means for connecting one of said driving motors across a brush of said primary brushes and a brush of said secondary brushes, other means for connecting the other of said driving motors across the other brush of said pair of primary brushes and the other brush of said pair of secondary brushes, an emergency electrical load absorbing means including a braking resistance, means for inserting said emergency load absorbing means in circuit with said one of said motors between said motor and said rotary transformer brushes and for removing said emergency load absorbing means from said circuit, a main electrical load absorbing means including a main load resistance, means in circuit with said main load absorbing means for connecting said main load absorbing means across said primary brushes, an exciter driven by said rotary transformer, a field exciting winding for controlling said rotary transformer, a field exciting winding for each of said motors, means for energizing said rotary transformer field exciting winding and said motor field exciting windings by said exciter, a field exciting winding for said exciter arranged to provide a component of excitation to said exciter dependent on the voltage across one of said motors, a second field exciting winding for said exciter arranged to provide a component of excitation to said exciter dependent on the voltage across said motor to a magnetic field circuit substantially independent of said exciter first-mentioned field exciting winding, a third field exciting winding for said exciter arranged to provide a component of excitation to said exciter substantially in opposition to and greater than said exciter second field exciting winding excitation, and means for energizing said exciter third field exciting winding independently of the voltage of said motors and said rotary transformer.

HAROLD NEWSAM.